(12) United States Patent
Manooki

(10) Patent No.: US 11,064,863 B2
(45) Date of Patent: Jul. 20, 2021

(54) HANGING BOTTLE DRYING RACK

(71) Applicant: Nareh Manooki, Burbank, CA (US)

(72) Inventor: Nareh Manooki, Burbank, CA (US)

( * ) Notice: Subject to any disclaimer, the term of this patent is extended or adjusted under 35 U.S.C. 154(b) by 0 days.

(21) Appl. No.: 16/035,621

(22) Filed: Jul. 14, 2018

(65) Prior Publication Data

US 2019/0038110 A1 Feb. 7, 2019

Related U.S. Application Data

(60) Provisional application No. 62/601,482, filed on Mar. 24, 2017.

(51) Int. Cl.
| | | |
|---|---|---|
| *A47L 19/04* | (2006.01) | |
| *A47J 47/20* | (2019.01) | |
| *A47B 96/16* | (2006.01) | |
| *A47B 81/04* | (2006.01) | |
| *A47G 25/06* | (2006.01) | |
| *A47G 25/74* | (2006.01) | |

(52) U.S. Cl.
CPC .............. *A47L 19/04* (2013.01); *A47B 81/04* (2013.01); *A47B 96/16* (2013.01); *A47G 25/0614* (2013.01); *A47G 25/746* (2013.01); *A47J 47/20* (2013.01)

(58) Field of Classification Search
CPC ......... A47L 19/04; A47B 81/04; A47B 73/00; A47B 73/008; A47B 43/003; A47B 96/16; A47B 61/02; A47F 7/28; A47F 7/285; A47F 7/143; A47F 5/0006; A47J 47/20; A47J 47/16; A47G 25/0614; A47G 25/0628; A47G 25/0685; A47G 25/74; A47G 25/746; D06F 57/12

USPC ... 211/74, 85.5, 85.13, 106.01, 44, 39, 57.1, 211/61, 70.6, 75, 85.25, 85.29, 96, 99, 211/100, 101, 119.004, 41.5, 41.6, 211/119.009
See application file for complete search history.

(56) References Cited

U.S. PATENT DOCUMENTS

| | | | | | |
|---|---|---|---|---|---|
| 1,274,172 | A | * | 7/1918 | Lee ............................ | A47F 5/01 211/106 |
| 1,389,984 | A | * | 9/1921 | Reed ........................ | A47J 47/16 211/104 |
| 1,394,947 | A | * | 10/1921 | Singer ...................... | A47J 47/16 211/41.11 |
| 1,587,676 | A | * | 6/1926 | Patterson ............ | A47G 25/0685 211/1.3 |
| 1,615,571 | A | * | 1/1927 | Crecelius .................. | A47K 1/09 132/308 |
| 2,311,932 | A | * | 2/1943 | Deckard ................. | E21B 19/14 182/38 |
| 2,428,073 | A | * | 9/1947 | Handel ................... | A47J 47/16 211/119.004 |
| 2,434,891 | A | * | 1/1948 | Swanson ................. | D06F 57/12 108/31 |

(Continued)

*Primary Examiner* — Jennifer E. Novosad

(57) ABSTRACT

The Hanging Bottle Drying Rack, tailored for baby and toddler bottles and cups, is a unique drying rack because it hangs on hooks, handles, over the door and such locations instead of sitting on the counter. It can hang in many convenient locations, (in any sink area: kitchen, rest room, or nursing room), look neat and uncluttered, and allow bottles, cups, and accessories to air dry without sitting in puddles of water. It can be assembled and disassembled per the user's desire of use and maintenance.

1 Claim, 2 Drawing Sheets

(56) References Cited

U.S. PATENT DOCUMENTS

| | | | | |
|---|---|---|---|---|
| 2,441,417 A * | 5/1948 | Hopkins | A47G 23/0241 | 211/100 |
| 2,483,051 A * | 9/1949 | Holt | D06F 57/12 | 211/104 |
| 2,894,639 A * | 7/1959 | Caporicci | A47K 1/09 | 108/28 |
| 3,186,558 A * | 6/1965 | Horstmann | A47J 47/16 | 211/75 |
| 3,391,891 A * | 7/1968 | Garden | B60N 3/102 | 108/135 |
| 4,205,620 A * | 6/1980 | Keys | G09F 11/02 | 116/308 |
| 4,289,243 A * | 9/1981 | Arbuzoff | A47L 23/20 | 211/100 |
| 4,485,929 A * | 12/1984 | Betts, Sr. | B01L 9/00 | 211/59.1 |
| 4,756,582 A * | 7/1988 | Heien | A47L 19/04 | 211/41.4 |
| 5,000,124 A * | 3/1991 | Bergen | A01K 5/0114 | 119/63 |
| 5,022,617 A * | 6/1991 | Henderson | A47G 25/0671 | 248/125.8 |
| 5,109,990 A * | 5/1992 | Murphy | A47J 47/20 | 211/41.3 |
| 5,163,567 A * | 11/1992 | Betts, Sr. | A47F 5/0815 | 211/59.1 |
| 5,567,029 A * | 10/1996 | Haenisch | F25D 23/04 | 211/100 |
| 5,713,552 A * | 2/1998 | Diamant | A47B 97/04 | 211/195 |
| 5,884,784 A * | 3/1999 | Betts, Sr. | B01L 9/00 | 206/278 |
| 6,021,906 A * | 2/2000 | Heien | A47J 47/20 | 211/41.3 |
| D450,462 S * | 11/2001 | Lazarz | D6/323 | |
| 6,443,316 B1 * | 9/2002 | Mao | A47F 5/0807 | 211/41.3 |
| 6,702,129 B1 * | 3/2004 | Harris | A47G 25/0664 | 211/172 |
| 6,805,246 B1 * | 10/2004 | Manabat | A47J 47/16 | 108/25 |
| 7,165,689 B2 * | 1/2007 | McDaniel | A47B 96/061 | 211/116 |
| D539,563 S * | 4/2007 | Grosfillex | D6/682.6 | |
| 7,578,399 B1 * | 8/2009 | Mulaw | A47J 47/20 | 211/10 |
| 7,931,161 B2 * | 4/2011 | Newbould | A47K 3/281 | 211/106 |
| RE43,349 E * | 5/2012 | Dunn | F26B 25/18 | 211/41.6 |
| 8,186,521 B2 * | 5/2012 | Yu | A47B 55/02 | 211/106 |
| 8,763,818 B1 * | 7/2014 | Pargansky | A47L 17/00 | 211/10 |
| 9,016,642 B1 * | 4/2015 | Ay | F16B 45/00 | 248/205.1 |
| 9,131,787 B2 * | 9/2015 | Berglund | A47F 5/0018 | |
| 2006/0065612 A1 * | 3/2006 | Gonneville | A47B 73/004 | 211/75 |
| 2007/0193651 A1 * | 8/2007 | Kauzlarich | A47F 1/035 | 141/86 |
| 2008/0104747 A1 * | 5/2008 | Mulaw | A47J 47/20 | 4/658 |
| 2009/0084739 A1 * | 4/2009 | Shock | A47B 81/007 | 211/4 |
| 2013/0326807 A1 * | 12/2013 | Ahn | A47J 47/20 | 4/630 |
| 2014/0001135 A1 * | 1/2014 | Bukowski | D06F 57/12 | 211/100 |
| 2015/0201750 A1 * | 7/2015 | Hopkins | A47B 73/008 | 211/75 |

* cited by examiner

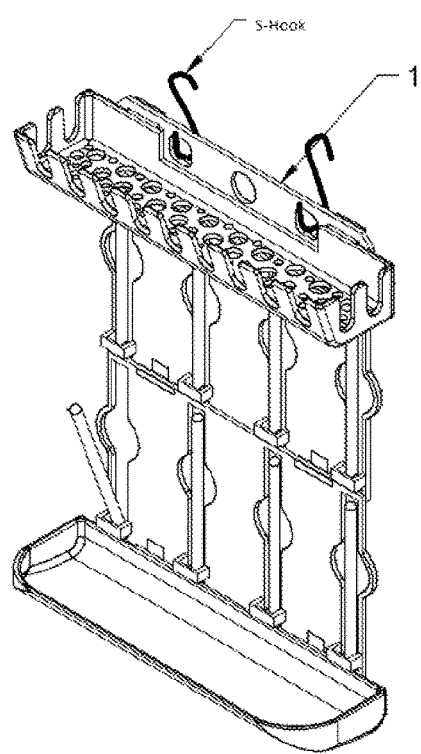
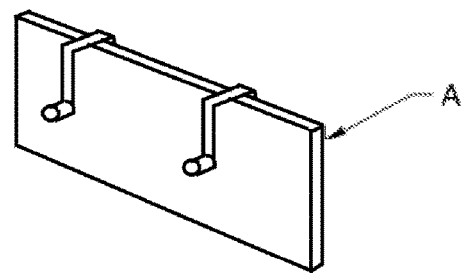
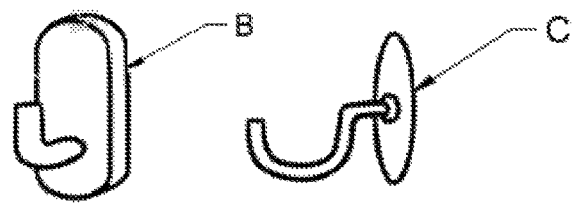
FIG 1
FIG 2

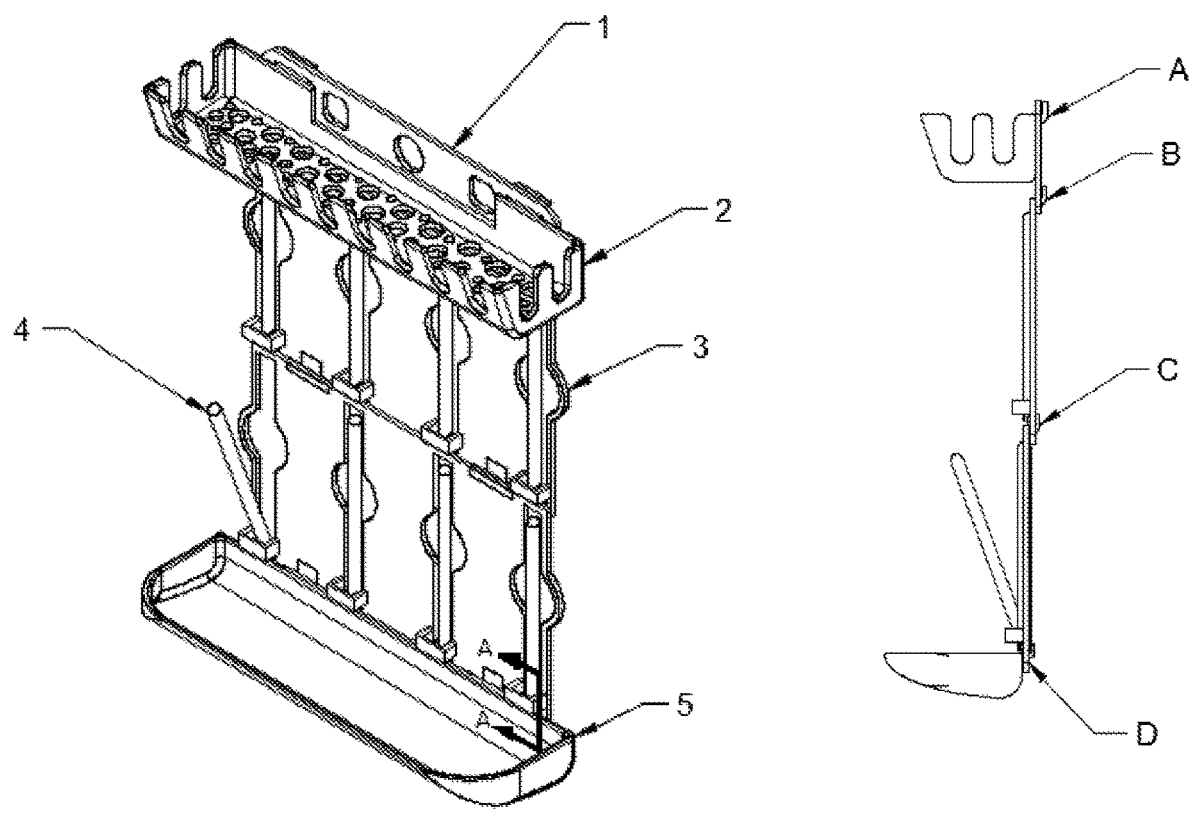
FIG. 3
FIG. 4
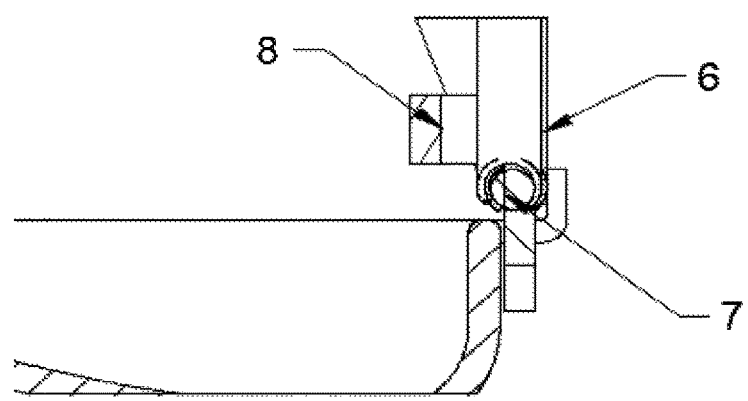
FIG. 5

HANGING BOTTLE DRYING RACK

BACKGROUND OF THE INVENTION

Drying baby bottles and accessories take up much-needed counter space in sink areas. Bottle usage increases when mother returns to work, especially if she is pumping as a set of bottles are needed with her, and another set of bottles with milk go with baby for his or her day. The bottle drying racks that exist today sit on the counter, look cluttered, and take up space. Some even pool up the water as the parts are placed on them, creating bacteria breading grounds.

SUMMARY OF THE INVENTION

The Hanging Bottle Drying Rack can hang on hooks instead of sitting on counter as current bottle racks do, taking up counter space. The Hanging Bottle Drying Rack looks neat and uncluttered, and it allow bottles, cups, and accessories to air dry without sitting in puddles of water.

DETAILED DESCRIPTION OF THE INVENTION

The Hanging Bottle Drying Rack can hang in many convenient locations: On mounted hooks, on cabinet doors or door handles, on towel racks, and so on. These hanging locations are easily found in kitchens, restrooms, or nursing rooms where bottles are washed and dried.

The hanging feature distinguishes the bottle rack from existing bottle racks because all existing racks sit on the counter. The improvement includes benefits of cleared counter space, neater look of drying area, and no pooling of water where bottles and accessories are hung.

The Hanging Bottle Drying Rack is easily assembled and disassembled to allow for customized use, cleaning and storage.

The Hanging Bottle Drying Rack can be assembled with just one row for 4 bottles or more rows for more bottles. Each row of current design allows 4 prongs to hold 4 bottles or cups. Each basket can fit several small parts such as nipples, caps and so on. Each Hanging Bottle Drying Rack can be augmented with more baskets with addition of more top parts. See FIGS. 1-5 and description to follow for further details.

DETAILED DESCRIPTION OF DRAWINGS

FIG. 1 Shows example Hanging Bottle Drying Rack hanging on standard S-Hooks. Rack can hang directly on hooks or use S-Hooks to hang on rods or handles in sink area wall or cabinet doors 2A. Standard hooks, such as 2B and 2C, on walls may also be used to hang the Hanging Bottle Drying Rack. User may hang using two hooks with two holes on left and right for better balance or 1 hook with one hole as preferred.

FIG. 3 is a perspective view of Hanging Bottle Drying Rack. Top frame 1 attaches to drying basket 2, which is designed to hold bottle accessories such as caps, nipples, and pacifiers. Mid section 3 attaches to top frame 1 and contains four slots for rotating prongs 4. Depending on desired number of bottles to dry, more quantity of mid section 3 may be attached, (FIG. 3 shows total of 2 mid sections 3). Rotating prongs 4 fold in flush to mid section 3 for storage and dishwasher; and rotate out as hangers for washed bottles to dry on. There are four prongs 4 per mid section 3. Drip pan 5 attaches to lowest mid section 3 piece to catch dripping water from bottles and accessories.

FIG. 4 shows side view of Hanging Bottle Drying Rack. Basket 2 attaches to Top Section 1 at point A. Mid Section 3 attaches to Top Section 1 at point B. Mid Sections 3 attach to each other at point C. drip pan 5 attaches to Mid Section 3 at point D.

FIG. 5 shows cross-section view taken along lines A-A in FIG. 3. Prong 6 rotates on attached hinge 7 of mid section 3. Prong rotates forward toward stop 8, part of Mid Section 3.

BRIEF DESCRIPTION OF DRAWINGS

FIG. 1 is a perspective view of an apparatus that is hung and in operative position.

FIG. 2 is perspective view of hanging hook options that apparatus can hang on.

FIG. 3 is a perspective view of apparatus in operative position.

FIG. 4 is a side view of apparatus in operative position.

FIG. 5 is a cross-sectional view taken along lines A-A in FIG. 3.

What is claimed is:

1. A hanging drying rack for supporting bottles and accessories, comprising:

substantially rectangular frame having a width extending in a horizontal direction and a height extending in a vertical direction and defining a vertical plane between front and rear vertical faces, the frame being adapted to be suspended and supported by hooks attached to an external vertical surface, with the frame including a first set of openings disposed horizontally and substantially near a top of the frame for suspension from said hooks, the frame further comprising a second set of openings disposed in columns and rows along the width and height of the frame and extending through the front and rear vertical faces, whereby the second set of openings define a shape that is non-rectilinear;

a basket removably attached to said front vertical face and located below the first set of openings, the basket being adapted to be removed from said frame for cleaning or storage purposes, the basket comprising a bottom surface with a plurality of apertures therein which allows for passage of liquid therethrough and a plurality of U-shaped recesses along at least a portion of the periphery of the basket being sized and arranged to be able to support the accessories;

a plurality of pegs disposed along the frame and within the second set of openings and defining a shape that is different than the shape of the second set of openings, whereby each of the pegs further comprises a hinge disposed approximate a bottom of a respective one of said second set of openings and a free distal end, such that the respective peg can be pivotally moved between a first operative position and a second storage position whereby when placed in the first operative position, the pegs extend outwardly away from said vertical front face at an angle less than 90 degrees, allowing each of said pegs to be able to support a bottle thereon between the free distal end and the hinge and to allow liquid to drip therefrom, and wherein when placed in the second storage position, the pegs are pivotally moved to dispose the peg within a respective one of said second set of openings such that the respective peg is disposed within the vertical plane of the frame and flush with the vertical front surface;

and a drip pan removably attached to said front vertical face approximate a bottom thereof below the second set of openings, and having a solid bottom surface for collecting the liquid from the basket and bottles disposed on the pegs, such that the drip pan is adapted to be removed from the frame for cleaning or storage purposes.

\* \* \* \* \*